Feb. 4, 1958 W. T. HARRIS 2,822,482
VARIABLE-POSITION TRANSDUCER
Filed Jan. 17, 1955
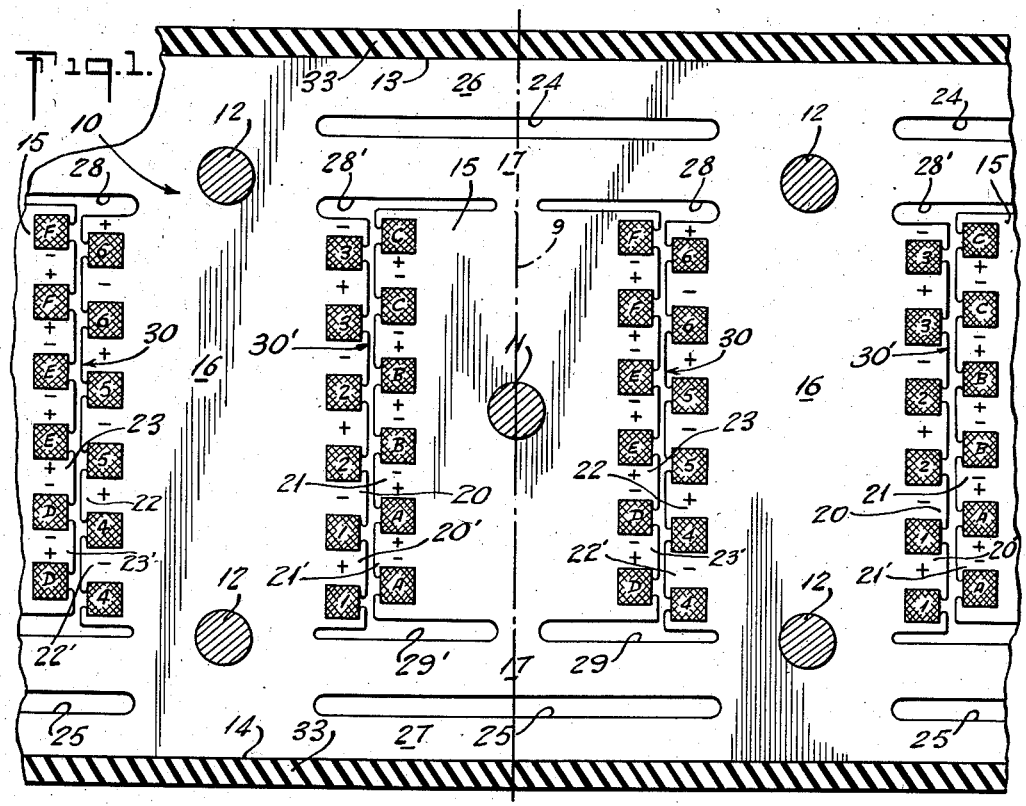
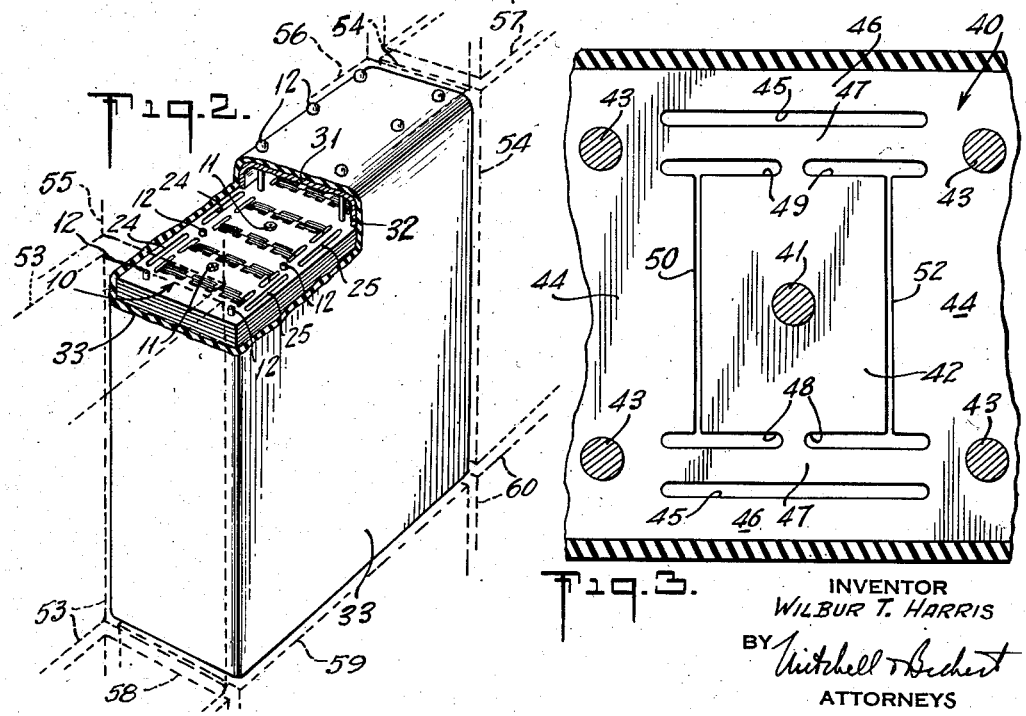
INVENTOR
WILBUR T. HARRIS
BY
ATTORNEYS

United States Patent Office 2,822,482
Patented Feb. 4, 1958

2,822,482
VARIABLE-POSITION TRANSDUCER

Wilbur T. Harris, Southbury, Conn., assignor to The Harris Transducer Corporation, Woodbury, Conn., a corporation of Connecticut Application January 17, 1955, Serial No. 481,988

21 Claims. (Cl. 310—15)

My invention relates to so-called variable-position transducers, as for underwater use, and is concerned with improvements over and modifications of the structures disclosed in my copending patent application, Serial No. 287,077, filed May 9, 1952, now U. S. Patent 2,713,127, July 12, 1955.

In said patent application, a variable-position transducer is disclosed as comprising an armature, spring-supported in a stator, and the oscillatory system so formed is excited electromagnetically. The device radiates by oscillating in position in a liquid medium.

Variable-position transducers constructed in accordance with said patent application are generally excellent in their advantages when designed for operation in the frequency range between 500 C. P. S. and 5000 C. P. S. However, for frequencies above 5000 C. P. S. the required optimum width of the flux gap becomes so small (less than 0.005 in.) that the construction becomes impractical. This is because (1) the amplitude of the flux-gap due to the vibration of the armature and stator must not be excessively small as compared to the average gap width (if the device is to operate efficiently), and (2) the amplitude varies inversely as the frequency for the same power level.

For frequencies below the range indicated, considerations of flux-gap width and amplitude of bodily displacement also render impractical the structures of said patent application. For example, a high-power transducer for operation at 100 C. P. S. might require a flux-gap width of the order of one centimeter, with the result that, if the gap is to be fully energized without large I²R losses in the coils, enormous coils are required. This necessitates greatly increasing the width of the laminations and leads to relatively massive structures.

It is, accordingly, an object of the invention to provide an improved transducer of the character indicated.

It is another object to provide a variable-position transducer structure inherently applicable to frequency response outside the response band of transducers of said patent application.

It is a further object to provide a very-low frequency variable-position transducer.

It is also an object to provide a very-low frequency parasitic radiator, for underwater use.

A specific object is to provide an efficient, very-high-power underwater-acoustic radiator in the frequency range 30 to 300 C. P. S.

It is a general object to meet the above objects with a structure requiring essentially no proportionally greater thickness (i. e., front-to-back, in the sense of longitudinal response normal to a transducer face) than for structures of said patent application, and for which copper requirements in an electromagnetically excited device can remain relatively small.

Also, it is a general object to achieve the above objects with a structure requiring a minimum of strategic materials and having the power handling capacity, per-unit weight or per-unit volume, of accepted industrial electrical equipment.

Other objects and various further features of novelty and invention will be pointed out or will occur to those skilled in the art from a reading of the following specification in conjunction with the accompanying drawings.

In said drawings, which show, for illustrative purposes only, preferred embodiments of the invention:

Fig. 1 is a fragmentary horizontal sectional view through a laminated transducer incorporating features of the invention;

Fig. 2 is a perspective view with covering parts broken away to show a completely consolidated stack of laminations as in Fig. 1 and constituting one element of an array, other elements of which are suggested by broken phantom lines; and Fig. 3 is a view similar to Fig. 1, to illustrate a parasitic radiator of the invention.

Briefly stated, my invention contemplates a basic variable-position transducer lending itself to magnetic excitation in such manner that, regardless of the amplitude of mechanical oscillation of armature and stator parts, the gap width between driving poles remains essentially constant. In the form to be described, the transducer comprises a consolidated stack of like laminations of magnetic material, such as silicon steel. Each lamination consists essentially of an inner substantially rectangular mass area, surrounded by an outer substantially rectangular mass area; the mass areas are integrally interconnected by stiffly yieldable means in such manner that the two mass areas react through the yieldable means to oscillate with bodily displacement in opposed-phase relation. The stack of basic laminations can be excited directly, as by magnetic reaction between the two mass areas, or parasitically, as by immersion in a liquid medium already excited by other means. Laminations may be formed integrally to comprise desired pluralities of adjacent pairs of reacting mass areas. Arrays of adjacent excited and parasitic stacks may thus be caused to resonate in unison, thereby extending the effective frontal area for a minimum employment of excited stacks.

Referring to Figs. 1 and 2 of the drawings, my invention is shown in application to a basic radiator element comprising a consolidated vertical stack of like laminations 10, tied together by means of bolts 11—12, and having a radiating response generally normal to the transducer end faces 13—14, constituting the stacked longitudinally opposite ends of laminations for convenience, the longitudinal or response axis is designated by the phantom line 9, through the central bolt 11, for the case of the elemental transducer section bracketed between the bolts 12 on the left and the bolts 12 on the right of Fig. 1. As in said copending application, the basic variable-position elemental area of each lamination comprises an inner or armature mass area 15 surrounded by an outer or stator mass area 16. Except for spring connection means 17 between the two mass areas 15—16, said two mass areas are effectively independent and, for the form shown, are substantially rectangular in shape. The arrangement of spring-connection means 17 is preferably such as to yield stiffly upon relative displacement of the inner and outer mass areas in the longitudinal sense, that is, normal to the radiating faces of the transducer.

As in said patent application, by forming the laminations of magnetic material, such as non-critical silicon steel, the construction lends itself to electromagnetic excitation. However, as distinguished from the method of excitation disclosed in said patent application, I employ magnetic circuits with gaps of essentially constant width and have shown the provision of winding openings or slots defining first opposed poles or pole pieces, as at 20—21 and 20'—21', for adjacent longitudinally extending edges of the inner and outer mass areas on one side of the longitudinal axis, and a second similar set of poles, as at 22—23 and 22'—23', on the other side of the longitudinal axis.

The parts of my integral lamination construction will be better identified by a description of the functions achieved by particular slots. A first pair of slots 24—25 is symmetrically disposed and extends transversely to the longitudinal axis 9 and is located near the longitudinally opposite ends of the lamination and defines with said longitudinally opposite ends 13—14 relatively thick, stiff, radiating members 26—27, constituting integral parts of the outer mass area 16 and centered on the longitudinal axis 9 of the central motor 15—16 depicted in Fig. 1. A second set of slots 28—28' and 29—29' extends transversely and symmetrically of the longitudinal axis; said slots are substantially transversely coextensive with the slots 24—25, but stop short of meeting on the longitudinal axis 9 so as to establish a direct and integral connection between the inner mass area 15 and the spring sections 17. The spring sections 17 will thus be seen as stiffly resiliently cantilevered, symmetrical suspensions of longitudinally spaced parts of the inner mass area 15, and these suspensions are shown at the longitudinally opposite ends of the inner mass area 15.

In order to permit a free relative movement of the poles 20—21 and 22—23, the gaps between poles may be viewed as part of elongated slots, as at 30' on one side of the longitudinal axis 9, and communicating between the outer limits of slots 28'—29' (i. e. outer, in the sense of being offset transversely from the longitudinal axis 9); similarly, the gaps between poles 22—23 may be viewed as part of an elongated gap 30, communicating between transverse outer limits of the slots 28—29. Since the device oscillates in the longitudinal mode, oscillation is parallel to the pole faces and, hence, the flux-gap widths do not change as the device operates.

The faces of corresponding pole pieces, as at 20—21 or at 22—23, are preferably not only substantially transversely opposed, as shown, but also longitudinally offset so that, when the various flux paths are excited in unison, forces transverse to the longitudinal axis 9 of the structure are nullified, and the only net forces generated are those of longitudinal relative propulsion of inner and outer mass areas 15—16. The pole pieces for the respective sides of the transducer element may be provided in any desired plurality, as dictated by design requirements, and in the form shown the poles 20—21 represent one of a set of five pairs of poles along the gap 29, while the poles 22—23 represent part of a similar distribution of poles along the gap 30. Polarization and excitation windings may be coupled to these poles so as to establish relative flux polarities as indicated by plus and minus symbols in the drawings.

In the form shown, polarizing windings are contained in the slots between poles in the stator or outer mass area 16, while excitation windings are contained in the slots between poles in the inner mass area 15. Thus, for the side defined by slot 29, each winding develops a force in the direction in which the device is constrained to oscillate, namely, along the longitudinal axis. The oscillation mechanism has the characteristic of a linear, oscillatory, salient-pole, synchronous motor. Winding connections can be, and preferably are, chosen for a balanced condition, so that two sets of D.-C. coils receive equal and opposite induced A.-C. voltages which balance out, making unnecessary the provision of series inductances in the D.-C. circuits, as will be understood.

The described unitary variable-position motor, as subtended between four corresponding adjacent front and back securing bolts 12, may complete the transducer, but I show in Figs. 1 and 2 my preference that each lamination 10 shall be formed with parts of a plurality of transversely adjacent motor elements. Parts of two such adjacent elements are shown to the right and to the left of the motor element subtended by bolts 12 in Fig. 1; the windings for these adjacent elements may be excited in unison with, or in phase-displaced relation with each other, depending on whether the device is to radiate normal to faces 13—14, or is to be "steered," as will be understood. For low-frequency operation, wavelengths are so large compared to a transducer-element width that "steering" between elements of a lamination 10 is generally not desirable.

To complete the structure, I employ end bells, for the top and bottom ends of the structure, as best shown at 31 in Fig. 2. The end bells 31 are cup-shaped, having outer projecting lips or edges 32 securely clamped to the outer exposed lamination 10 of the stator. The thickness of each end bell 31 may be of the order of width of the radiating members 26—27, so that, when clamped in the position shown, these parts directly overstand one another. The end bells are secured in place between bolts 12, tying all stator parts together; the bolts 11, which tie the armature parts together, are completely independent of connection to the end bells. Thus, the end bells may form part of the solid structure of the outer mass or stator 16, for stiffly compliant oscillating reaction with the inner mass or armature 15. In order to seal the windings and laminations from water or other corrosive effects, I apply a heavy blanket or boot 33 of sound-transmitting rubber or rubber-like material to the entire structure, including all bolt heads.

As indicated generally above, my basic resonant structure lends itself not only to the internally driven embodiment presently described in detail, but also to parasitic or external excitation. For such purposes, the windings described in connection with Fig. 1 may be omitted or may be merely not excited; however, for lower cost, I prefer a simpler lamination construction, best illustrated in Fig. 3.

The arrangement of Fig. 3 comprises a consolidated vertical stack of laminations 40, tied together by bolts 41 securing the inner mass area 42, and by bolts 43 securing the outer mass area 44. Elongated transversely extending slots 45 serve to define stiff radiating members 46 constituting integral parts of the outer mass area 44, and also to isolate the same from stiffly yieldable means 47, integrally connecting the inner and outer mass areas. Further transverse slots 48—49 define longitudinally opposite ends of the inner mass area 42, and longitudinally extending slots 50—52 communicate between outer limits of slots 48—49 so as to isolate the inner and outer mass areas. A rubber or rubber-like boot may encase the parasitic structure, as at 33 for Fig. 1.

By proportioning the parts of Fig. 3 in a manner analogous to those of Fig. 1, the structure of Fig. 3 may have the same inherent mechanically resonant properties and may be employed side-by-side with a driven transducer, as depicted in Fig. 2. In Fig. 2, the phantom elements 53—54 . . . 60 suggest parasitic radiators of the Fig. 3 variety, adjacent opposite sides of the driven element having laminations 10, of the variety discussed with Fig. 1.

When the motor elements of the array of Fig. 2 are excited, the parasitic elements 53 to 60 are also driven, i. e., by the electrically driven elements, with coupling through the liquid medium in which they are all immersed. At resonance, the parasitic elements move so as to very approximately oppose the alternating pressure impinging on them. They continuously absorb and re-radiate energy by processes analogous to those known to characterize electromagnetic-radiation phenomena.

The arrangement of Fig. 2 will be understood merely to suggest the combination of active and parasitic elements in an array. Actually, larger numbers of elements are needed in order to obtain significant advantages. Generally, nine elements (three elements horizontally, by three elements vertically) is considered a minimum number for an array, and in such case, all but the center element should be parasitic, there being need only to energize the center element in order to drive all nine elements, through liquid coupling from the single electrically excited element to the surrounding eight parasitic elements.

As pointed out above, the openings or slots 24—25

(or 45) are necessary to define the spring members or connections 17. The sections 26—27 (or 46) are of such longitudinal extent (or relative thickness) that the loading of the medium does not normally cause these sections alone to resonate at the operating frequency of the transducer, but rather they are usually stiff enough so that the resonant system formed by their stiffness and the mass reactance of the adjacent medium has a much higher frequency. Hence, the members 26—27 may be regarded as stiff pressure transmitters.

For applications at the upper frequency limit of the linear-motor-type variable-position transducer, there may be circumstances under which it will be advantageous to employ the sections 26—27 (or 46) as resonant radiators. This is related to my other copending patent applications, Serial No. 434,278, filed June 3, 1954, Serial No. 241,470, filed August 11, 1951, and Serial No. 427,630, filed May 4, 1954, in all of which I discuss advantages of resonant radiating mechanisms. However, in these patent applications, the resonant or compliant radiator was necessary to the attainment of high electroacoustic conversion efficiency, whereas the present mechanism is capable of almost ideal efficiency without employing the compliant radiator, and hence the compliance is not an essential requirement of the present invention. Furthermore, radiation from a surface executing uniform, piston-type motion is generally preferable.

It will be seen that I have described an ingenious variable-position transducer lending itself to efficient high-power electroacoustic conversion at frequencies substantially beyond limits achievable with structures of said Patent No. 2,713,127. Regardless of the amplitude of mechanical oscillation, there is no appreciable change in gap width, and there is virtually no limit to the forces which can be established between the reacting oscillating masses. With proper core and coil design, efficiencies of the order of 90 percent may be achieved at frequencies as low as 30 C. P. S.

While I have described the invention in detail for the preferred forms shown, it will be understood that modifications may be made within the scope of the invention as defined in the claims which follow.

I claim:

1. In a transducer of the character indicated, an armature body, a rigid exterior stator body surrounding said armature body, means within the peripheral confines of said stator body reactively connecting said armature body to said stator body, said bodies and said means being of magnetic flux-conducting material and said bodies having through the reactive connection a natural predetermined mechanical oscillating characteristic along a longitudinal axis of oscillation, said bodies and said means defining a magnetic circuit extending through said bodies and including a gap defined by longitudinally offset pole faces, said pole faces being spaced transversely with respect to said longitudinal axis.

2. In a transducer of the character indicated, an armature body, a rigid exterior stator body surrounding said armature body, means within the peripheral confines of said stator body reactively connecting said armature body to said stator body, said bodies and said means being of magnetic flux-conducting material and said bodies having through the reactive connection a natural predetermined mechanical oscillating characteristic on a longitudinal axis of oscillation, said bodies and said means defining a magnetic circuit extending through pairs of spaced offset poles and including two gaps on opposite sides of the longitudinal axis of said transducer.

3. In a transducer of the character indicated, an armature body, a rigid exterior stator body surrounding said armature body, means within the peripheral confines of said stator body reactively connecting said armature body to said stator body, said bodies having through the reactive connection a natural predetermined mechanical oscillating characteristic along a longitudinal axis of oscillation, said bodies and said means including a magnetic circuit extending through said bodies and including a gap defined between transversely spaced pole faces longitudinally offset from each other.

4. In a transducer of the character indicated, a relatively stiff armature body, a relatively stiff stator body, spring members within the peripheral confines of said stator body and reactively connecting said armature body to said stator body, said bodies having through the reactive connection a natural predetermined mechanical resonant oscillatory frequency on a longitudinal axis, said spring members connecting said bodies at longitudinally opposite ends thereof, said bodies and said spring members being of magnetic flux-conducting material and defining a magnetic circuit extending through said bodies and means coupled to said circuit for exciting said transducer at its resonant frequency.

5. A parasitic resonator, comprising a rigid exterior body surrounding a rigid inner body, means within the peripheral confines of the exterior body reactively connecting longitudinally opposite ends of the inner body to the exterior body, said bodies having through the reactive connection a predetermined mechanical oscillating frequency in a longitudinal mode of operation.

6. A resonator according to claim 5, in which said exterior body is elongated in the direction transverse to said longitudinal mode and surrounds a plurality of transversely spaced rigid inner bodies, each inner body being reactively connected to said exterior body.

7. In combination, two transducer elements in side-by-side relation, each element comprising a rigid exterior body surrounding a rigid inner body, means within the peripheral confines of said bodies reactively connecting the inner body to the exterior body, said bodies having through the reactive connection a natural predetermined mechanical oscillating frequency on a longitudinal axis of oscillation, and magnetic-excitation means including a magnetic gap extending between the bodies of one of said elements, said excitation means reacting between said bodies and in a direction effectively along said axis for exciting said one transducer element at substantially said frequency, whereby the second of said elements may be driven parasitically when immersed in a fluid medium.

8. In combination, three transducer elements in side-by-side relation, each element comprising a rigid exterior body surrounding a rigid inner body, means within the peripheral confines of said bodies reactively connecting the inner body to the exterior body, said bodies having through the reactive connection a natural predetermined mechanical oscillating frequency along a longitudinal axis of oscillation, and magnetic excitation means including a magnetic gap extending between the bodies of the center one of said three elements, said excitation means reacting between said bodies and in a direction effectively along said axis for exciting said center transducer element at substantially said frequency, whereby the other of said elements may be driven parasitically.

9. In a transducer of the character indicated, a consolidated stack of laminations of magnetic flux-conducting material, each lamination including an armature mass area and a stator mass area, said stator mass area surrounding said armature mass area, means within the peripheral confines of the stator mass area reactively connecting the armature mass area to the stator mass area, said mass areas having through the reactive connection a natural predetermined mechanical oscillating frequency on a longitudinal axis of oscillation, said mass areas establishing magnetic flux paths including two gaps respectively on opposite sides of the central longitudinal axis of said transducer and defined between transversely spaced pole pieces longitudinally offset from each other, said pole pieces at each said gap being respectively on said armature mass area and on said stator mass area.

10. In a transducer of the character indicated, a consolidated stack of laminations, each lamination comprising an armature mass area and a stator mass area, said stator mass area substantially surrounding said armature mass area, said armature mass area being integrally and resiliently connected to said stator mass area, whereby a mechanically resonant response is defined on a longitudinal axis, said areas being connected at locations longitudinally symmetrically disposed with respect to the longitudinal center of said transducer and yieldable predominantly along said axis, there being a first flux gap between pole faces at longitudinally offset and transversely opposed locations on said stator mass area and on said armature mass area and on one side of said axis, there being a second flux gap between pole faces at longitudinally offset and transversely opposed locations on said stator mass area and on said armature mass area and on the opposite side of said axis, and electrical winding means linked to said stack in a relation to establish flux circulation on the one hand through one gap and through adjacent portions of said armature mass area and said stator mass area, and, on the other hand, through the other gap and adjacent portions of the armature mass area and the stator mass area.

11. In a transducer of the character indicated, a consolidated stack of laminations, each lamination comprising an outer mass area and an inner mass area, said outer mass area surrounding the inner mass area, said inner mass area being integrally and resiliently connected to said outer mass area, whereby a mechanically resonant response is defined on a longitudinal axis, said areas being connected at longitudinally spaced locations symmetrically disposed with respect to the longitudinal center of said transducer and yieldable predominantly along said axis.

12. In a transducer of the character indicated, a consolidated stack of laminations, each lamination comprising an outer mass area and an inner mass area, said outer mass area surrounding the inner mass area, said inner mass area being integrally and resiliently connected to said outer mass area, whereby a mechanically resonant response is defined on a longitudinal axis, said areas being connected at longitudinally spaced locations symmetrically disposed with respect to the longitudinal center of said transducer and yieldable predominantly along said axis, the respective longitudinally opposite ends of said inner mass area being connected to said yieldable connection on said axis.

13. In a transducer of the character indicated, a consolidated stack of laminations, each lamination comprising an outer mass area and an inner mass area, said outer mass area surrounding the inner mass area and being integrally and resiliently connected thereto to define a longitudinal resonance axis, said areas being connected at longitudinally spaced locations symmetrically disposed with respect to the longitudinal center of said transducer and yieldable predominantly along said axis, the opposed adjacent lateral edges of said inner and outer mass areas having formed therein a plurality of winding pockets defining therebetween longitudinally staggered pole faces, the number of pairs of opposed pole faces on one side of said axis being equal to the number of opposed pole faces on the other side of said axis.

14. The combination of claim 13, in which balanced excitation windings are coupled to the poles on one of said mass areas, and balanced polarizing windings are coupled to the poles on the other of said mass areas.

15. A transducer lamination, comprising an inner mass area completely surrounded by an outer mass area and integrally connected thereto by compliant stiffly yieldable means, said means being yieldable along a longitudinal axis, whereby a longitudinal resonance axis is defined, the longitudinally opposed ends of said outer mass area being relatively stiff and effectively isolated from said compliant connection.

16. A transducer lamination, comprising an inner mass area completely suurrounded by an outer mass area and integrally connected thereto by compliant stiffly yieldable means, said means being yieldable for relative displacements of said areas along a longitudinal axis, the longitudinally opposed ends of said outer mass area being relatively stiff and effectively isolated from said compliant connection, and said compliant section extending transversely from the longitudinal ends of said inner mass area to transversely opposed locations near the longitudinally opposite ends of said outer mass area.

17. A lamination according to claim 16, in which said compliant connections to the inner mass area are essentially on the longitudinal axis of the lamination and are essentially isolated from the transverse limits of the inner mass area.

18. A lamination according to claim 16, in which the inner mass area includes bolt-receiving means symmetrically disposed with respect to said axis, and said outer mass area includes bolt-receiving means symmetrically disposed with respect to said axis.

19. A transducer lamination having a response on a longitudinally extending axis and having longitudinally spaced, opposed, substantially parallel, radiating edges, said lamination having two elongated slots extending symmetrically on opposite sides of the longitudinal axis of the lamination and at locations effectively inwardly spaced from the longitudinally opposite ends of said lamination to establish the portion between said slots and the adjacent ends as an element of a stiff relatively non-yieldable radiating piston, said lamination having near the respective longitudinally opposite ends and intermediate said ends and the adjacent slots further slots extending transversely and symmetrically with respect to the longitudinal axis but short of meeting on said axis, and said lamination further having elongated transversely offset slots symmetrically spaced about said axis and communicating between the respective transverse limits of said further slots, whereby between the adjacent first and second defined transversely extending slots there is defined a stiff compliant connection between an inner mass body and outer mass body, said bodies having inherent mechanically oscillating reaction through said compliant connection in a longitudinal mode on said axis.

20. A transducer lamination having a response on a longitudinally extending axis and having longitudinally spaced, opposed, substantially parallel, radiating edges, said lamination being internally slotted with a plurality of transversely separated like slot patterns, each pattern serving to define a rigid inner body surrounded by a rigid outer body, said outer bodies being united in common and with said radiating edges, integral spring members reactively connecting said inner and outer bodies to establish natural mechanical resonance between said bodies in the longitudinal sense.

21. In a transducer of the character indicated, a rigid armature body, a rigid stator body, a compliant reactive connection between said bodies and establishing a natural mechanically resonant frequency of relative oscillation of said bodies along a predominant axis, a radiating piston directly connected to and forming part of one of said bodies, said bodies and reactive connection being of magnetic flux-conducting material and said bodies including opposed pole pieces spaced transversely and longitudinally offset with respect to the sense of said axis, and means electromagnetically reacting between said armature and stator bodies to drive said transducer at resonance.

References Cited in the file of this patent

UNITED STATES PATENTS

| | | |
|---|---|---|
| 2,269,760 | Eldredge | Jan. 13, 1942 |
| 2,317,166 | Abrams | Apr. 20, 1943 |
| 2,619,605 | Lancor | Nov. 25, 1952 |
| 2,712,124 | Ording | June 28, 1955 |